United States Patent [19]
Poland

[11] Patent Number: 5,961,464
[45] Date of Patent: Oct. 5, 1999

[54] ULTRASOUND CONTRAST AGENT DETECTION USING SPECTRAL ANALYSIS FROM ACOUSTIC SCAN LINES

[75] Inventor: McKee D. Poland, Andover, Mass.

[73] Assignee: Hewlett-Packard Company, Palo Alto, Calif.

[21] Appl. No.: 09/154,061

[22] Filed: Sep. 16, 1998

[51] Int. Cl.[6] .................................................. A61B 8/00
[52] U.S. Cl. ............................................................ 600/458
[58] Field of Search ................................. 600/443, 447, 600/448, 453, 454, 438, 458

[56] References Cited

U.S. PATENT DOCUMENTS

| 5,255,683 | 10/1993 | Monaghan . | |
|---|---|---|---|
| 5,456,257 | 10/1995 | Johnson et al. . | |
| 5,558,092 | 9/1996 | Unger et al. | 128/660 |
| 5,577,505 | 11/1996 | Brock-Fisher et al. . | |
| 5,733,527 | 3/1998 | Schutt | 600/458 |
| 5,740,128 | 4/1998 | Hossack et al. | 600/458 |
| 5,833,614 | 11/1998 | Dodd et al. | 600/458 |

FOREIGN PATENT DOCUMENTS

0851241A2  6/1998  European Pat. Off. ........ G01S 15/89

*Primary Examiner*—Scott M. Getzow
*Assistant Examiner*—Maulin Patel

[57] ABSTRACT

A method for detecting the presence of contrast agent in the body of the patient initially transmits ultrasound pulses along respective acoustic scan lines, which pulses exhibit a fundamental transmission frequency. A set of returned signals are received along a respective scan line after each pulse transmission. The frequency content of each set of return signals is segregated into first and second groups, the first group positioned about the fundamental transmission frequency and the second group positioned about a harmonic frequency thereof. Thereafter, a relationship is determined as between the energy characteristics of the first group and the second group, for each set of return signals. The determined relationship for a scan line indicates a proportion of the return signal that is returned from contrast agent versus a proportion which is returned from tissue. Accordingly, only a single scan line is required to achieve data that enables differentiation between signal returns from tissue and signal returns from contrast agent.

14 Claims, 4 Drawing Sheets

SPECTRUM IN ABSENCE OF CONTRAST AGENT

SPECTRUM WITH CONTRAST AGENT RESONATING

SPECTRUM WITH CONTRAST AGENT IN DESTRUCTION

SPECTRUM ILLUSTRATING FREQUENCY BINS

5,961,464

ULTRASOUND CONTRAST AGENT DETECTION USING SPECTRAL ANALYSIS FROM ACOUSTIC SCAN LINES

FIELD OF THE INVENTION

This invention relates to ultrasound imaging systems and, more particularly, to a method and apparatus for enabling improved detection of ultrasound signal responses from tissue that has been perfused with a contrast agent.

BACKGROUND OF THE INVENTION

Currently, ultrasound contrast agents enable the study of perfusion or distribution of blood supply within body tissues. Such contrast agents commonly comprise small microbubbles or gas-filled spheres and are strong scatterers of ultrasound signals. Hence, if they are injected into the blood supply of an organ or other tissue, their passage can be detected by examining the increase in back-scattered ultrasonic signals, using standard ultrasound imaging equipment.

It is known that some contrast agents provide a second harmonic response to impinging ultrasound energy at pressure amplitudes below a pressure which causes destruction thereof. Further, at moderately high pressure amplitudes, the response of microbubbles to ultrasound energy can be highly nonlinear, as a result of rupture of the microbubbles. This acoustically induced destruction and collapse of the microbubbles produces an even larger second nonlinear response to interrogating ultrasound signals.

U.S. Pat. No. 5,255,683 to Monaghan interrogates a tissue sample (in the absence of a contrast agent) during a first time period. During a second time period, after administration of the contrast agent, the same tissue sample is interrogated. After the first interrogation, the frequency characteristic data of the ultrasound energy reflected by the tissue is determined. During the second time period, frequency characteristic data of the reflected ultrasound energy is again acquired. The two sets of frequency data are then compared to obtain an indication of the presence of the agent in the tissue. Accordingly, the Monaghan system requires storage data pertaining to the frequency characteristics of the first scan and of the second scan, in addition to requiring substantial data processing to enable correlation of the first imaged tissue section to the second imaged tissue section. Such correlation is difficult to achieve and renders the Monaghan system impractical in application.

U.S. Pat. No. 5,456,257 to Johnson et al. describes an ultrasonic diagnostic system which detects the presence of contrast agents. Return echo energy is detected both before and after destruction of the contrast agent, during successive high-power scan lines. The return energies are subtracted to derive a measure of echo energy due to the destroyed contrast agent only. As with the Monaghan system described above, the Johnson et al. system requires plural scan lines to be acquired to enable the subtraction of data from both pre and post-destruction of the contrast agent.

U.S. Pat. No. 5,577,505 to Brock-Fisher et al., assigned the same Assignee as this application, describes an ultrasonic imaging system wherein non-linear responses of a contrast agent are measured, using multiple excitation levels. The responses gathered from the multiple excitation levels are gain-corrected in an amount corresponding to the difference in excitation levels and are then subtracted. Because of this subtraction, most of the linear response is removed and what remains corresponds to the non-linear response from the contrast agent. Here again, plural scan lines are required to gather the data identifying the return signals from the contrast agent.

Accordingly, there is a need for an improved ultrasound imaging system and method wherein contrast agent is identified using a single interrogation scan line. Further, the system should be able to detect the presence of contrast agent through use of lower power signal transmission levels so as to achieve longer contrast agent lifetime in the perfused tissue, and as result, lesser required dosages of the infused contrast agent.

SUMMARY OF THE INVENTION

A method for detecting the presence of contrast agent in the body of the patient initially transmits ultrasound pulses along respective acoustic scan lines, which pulses exhibit a fundamental transmission frequency. A set of returned signals are received along a respective scan line after each pulse transmission. The frequency content of each set of return signals is segregated into first and second groups, the first group positioned about the fundamental transmission frequency and the second group positioned about a harmonic frequency thereof. Thereafter, a relationship is determined as between the energy characteristics of the first group and the second group, for each set of return signals. The determined relationship for a scan line indicates a proportion of the return signal that is returned from contrast agent versus a proportion which is returned from tissue. Accordingly, only a single scan line is required to achieve data that enables differentiation between signal returns from tissue and signal returns from contrast agent.

DETAILED DESCRIPTION OF THE PREFERRED EMBODIMENT

Briefly stated, the invention detects the presence of contrast agent in a tissue region being examined by ultrasound, by examining the frequency energy in a pair of separate frequency bands. The bubble size distribution of the contrast agent acts to spread the harmonic energy across the harmonic frequencies. The harmonic energy is calculated in real time by separate filters and the energy results from the two filtered frequency bands are mathematically combined by subtraction or division so as to represent the relative presence of contrast agent. In accordance with the determined relative presence of contrast agent, color levels are mapped in accord therewith and are overlaid on the image being presented on the ultrasound display.

Figure 1:
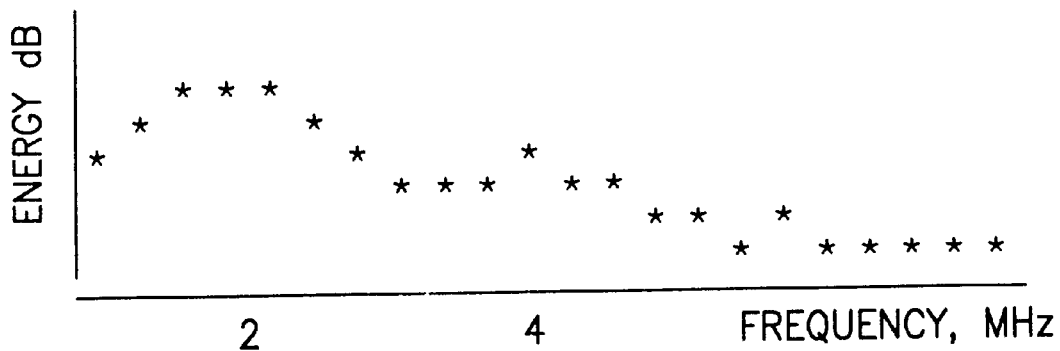
FIG. 1 is a plot of received signal energy versus frequency in a returned ultrasound signal, in the absence contrast agent in the tissue sample being insonicated.
Figure 2:
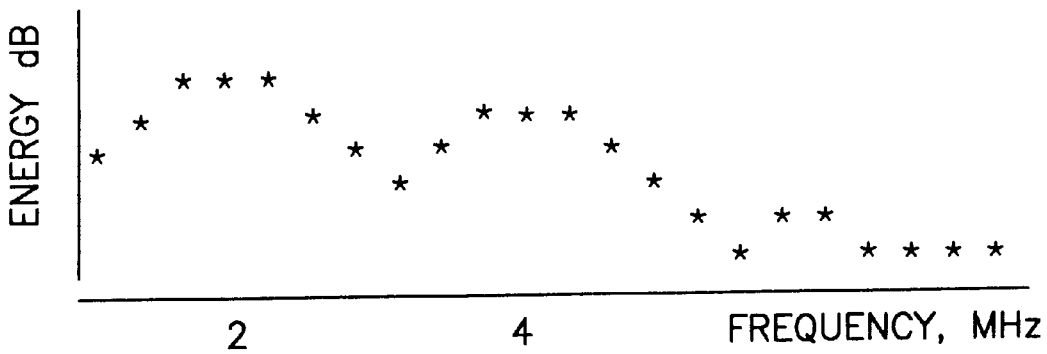
FIG. 2 is a plot of received signal energy versus frequency in a returned ultrasound signal, for a tissue sample which has been infused with contrast agent that is insonicated using a level of energy of interrogating signal which causes the contrast agent to resonate, but not to be destroyed.
Figure 3:
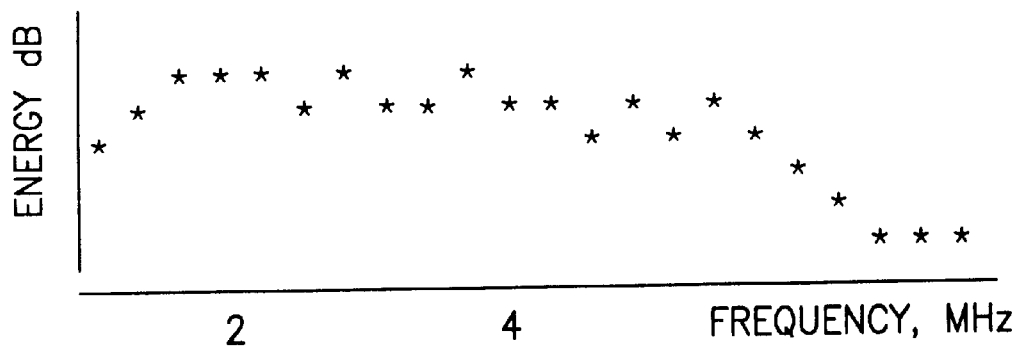
FIG. 3 is a plot of received signal energy versus frequency in a returned ultrasound signal, wherein the tissue sample has been perfused with contrast agent and is insonicated with ultrasound energy at a power level sufficient to cause destruction of at least a part of the contrast agent.

FIGS. 1–3 show that the spectral content of received echoes vary based upon (a) the amount of contrast agent present in the tissue being insonicated, and (b) the amount of contrast agent destruction which occurs at higher transmit power levels. FIG. 1 shows a typical spectrum of tissue that is scanned, without contrast agent, assuming a fairly narrow band transmit frequency around 2 megahertz. The spectrum includes some harmonic response around 4 megahertz, due to the nonlinearity of response from the insonicated tissue.

FIG. 2 shows the same spectrum when contrast agent has been introduced into the tissue. The nonlinearity of signal response due to the contrast agent creates a significant level of response at the second harmonic of the fundamental transmission frequency (about 4 megahertz). In this instance, the transmission power of the interrogating signals is low enough that the contrast agent is not significantly destroyed. Only the signal resulting from the resonance effect of the contrast agent is evident.

In FIG. 3, the transmit power of the interrogating ultrasound signal is set sufficiently high so as to cause contrast agent destruction. This action produces not only return signals that exhibit substantial levels of harmonics about 4 megahertz, but also exhibit broadband energy from about 3 megahertz and up. Accordingly, regardless of whether the contrast agent is destroyed or not, the ratio of energy above 3 megahertz to the energy around 2 megahertz increases significantly with the presence of the contrast agent. The use of a higher transmit power serves to enhance the effect by spreading more energy above 3 megaHertz.

Thus, by comparing the energy levels of the signal spectra grouped about the fundamental frequency (2 megahertz) and that above 3 megahertz and grouped around 4 megahertz (the second harmonic), the relationship of the amount of signal due to signal returns from the contrast agent can be determined in regards to the signal returns from tissue. As importantly, such data can be achieved from signal data achieved by a single scan line (i.e., from a single interrogating pulse) and the return signals which result therefrom.

Figure 4:
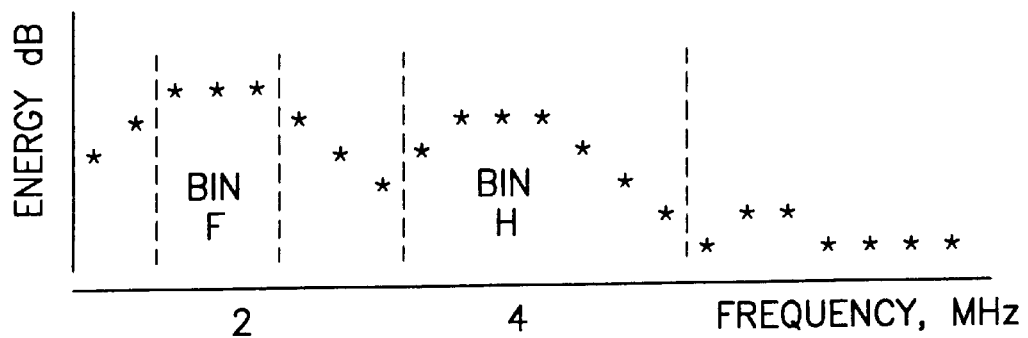
FIG. 4 is a plot of received signal energy versus frequency in a returned ultrasound signal, illustrating frequency bands or "bins" that are established to enable distinction between signals received from contrast agent versus signals received from tissue.

FIG. 4 illustrates placement of frequency "bins" about the fundamental (F) and the second harmonic (H) in the received signal spectrum. Frequency bins F and H are generated from sample signal sets along the acoustic received line. It may be desirable to make bin H wider to capture more of the nonlinear portion of the spectrum, so as to emphasize the harmonic portion in the determination of the ratio of the harmonic to the fundamental bins.

As can thus be seen, there is no "base-line" data acquisition required from an initial interrogation to achieve the spectral comparisons.

Figure 5:
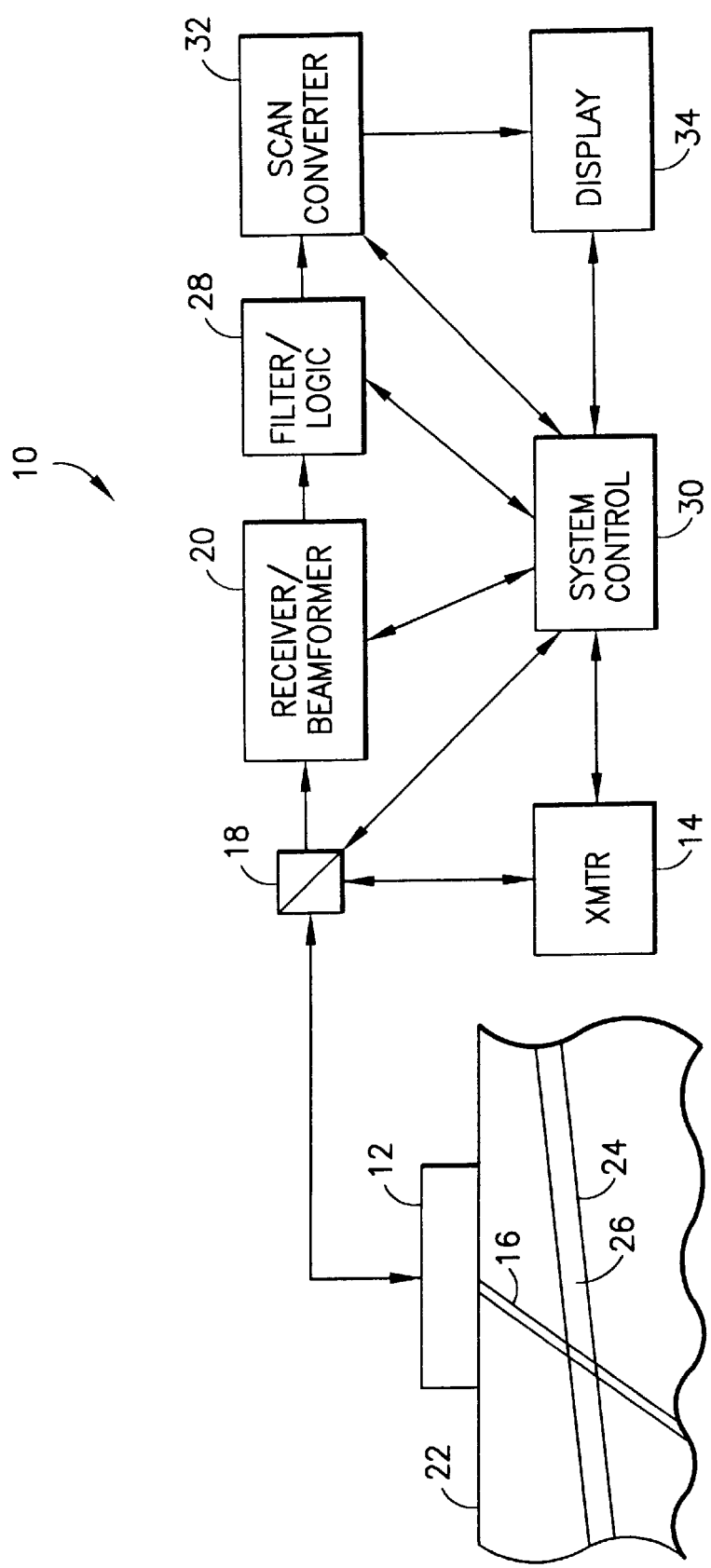
FIG. 5 is a high level block diagram of an ultrasound imaging system that incorporates the invention hereof.

Referring now to FIG. 5, ultrasound imaging system 10 includes a transducer 12 which, under control of a transmitter 14, is caused to issue ultrasound interrogating pulses along a plurality of scan lines. FIG. 5 shows a single scan line 16, along which an interrogating pulse is propagated and along which return signals are received. Those return signals are fed via a transmit/receive switch 18 to a receiver/beamformer module 20 which processes the return signals and converts them into digital data. The digital data are indicative of the frequency spectrum contained within the return signals from various depths within the tissue being imaged.

If it is assumed that tissue sample 22 includes a vessel 24 which includes a contrast agent 26, the contrast agent will act to return signal energy in a frequency range about the second harmonic of the fundamental transmission signal frequency. Receiver/beamformer module 20 accumulates the received ultrasound signals, performs the known beam forming functions, outputs the beam data to a filter/logic module 28.

Filter/logic module 28 derives digital data representative of the spectral frequency content (and energy thereof) of the beam data. The digital frequency data is then segregated into plural bins, one bin positioned about the fundamental ultrasound transmission frequency and a second bin positioned about the second harmonic of the fundamental frequency. Within filter/logic module 28, the energies contained by the frequency samples falling into the respective bins are summed, averaged and then subtracted (or divided) to determine a ratio therebetween. That ratio is indicative of the amount of energy in the return signal from the contrast agent as compared to the amount of energy in the return signal from the tissue response.

A system control module 30 assigns a color value in accordance with the magnitude of the ratio, thereby enabling a user to differentiate the contrast agent (and the strength of the contrast agent return) from the remainder of the image. A scan converter 32 converts the output from filter/logic module 28 into a sector scan which is then fed to display 34 for presentation to the user. Note that the color presentation will preferably be overlaid on the ultrasonically imaged anatomical details.

Figure 6:
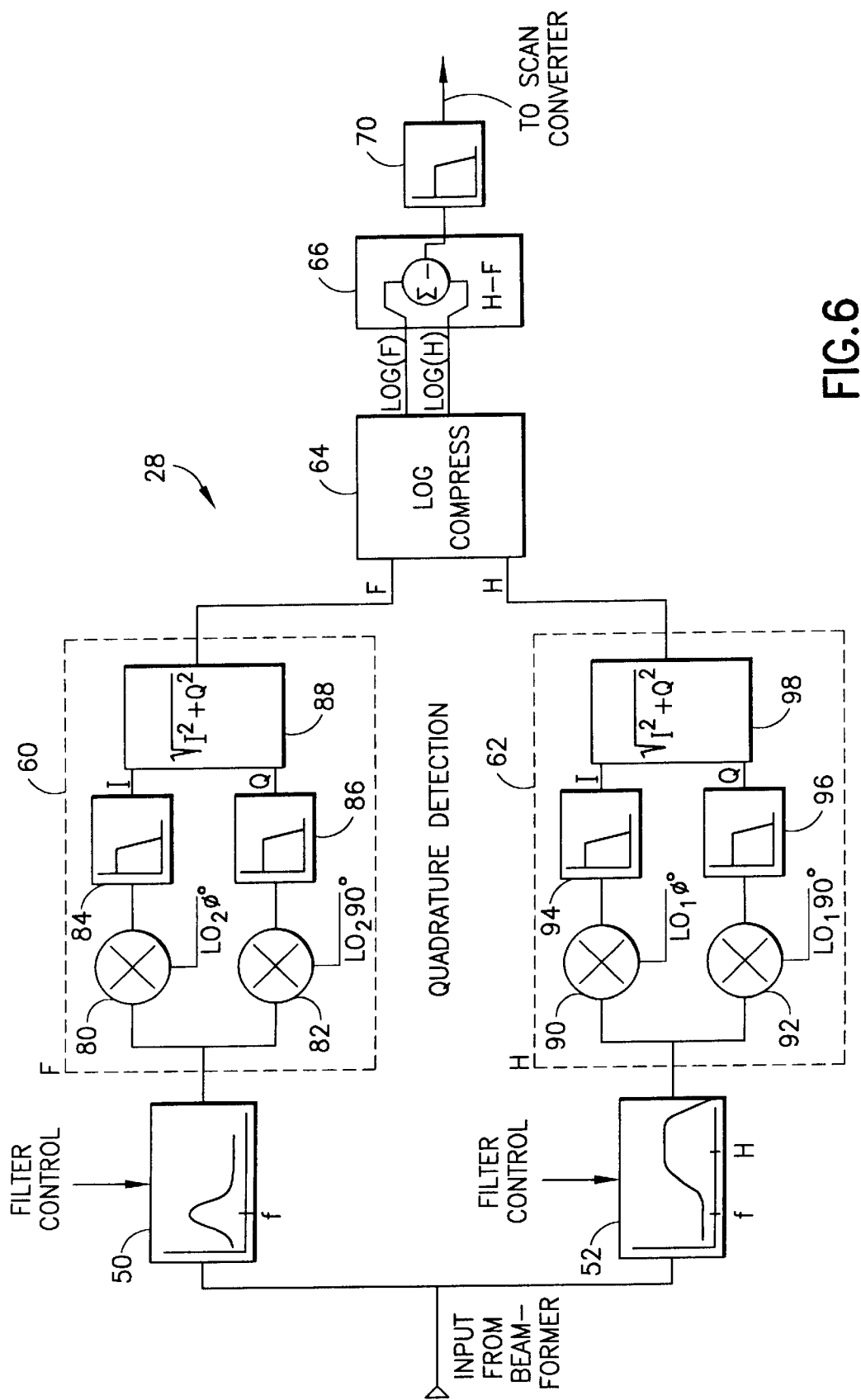
FIG. 6 is a further detailed block diagram of a filter logic module which is utilized to compare frequency spectra returns from tissue and contrast agent.

Turning now to FIG. 6, further details will be provided with respect to filter/logic module 28. The input from receiver/beamformer module 20 is applied to a pair of filters 50 and 52. Filter 50 has its center frequency positioned at the fundamental frequency of the transmitted ultrasound beam. The bandwidth of filter 50 is set, depending upon the expected tissue response bandwidth. By contrast, filter 52 has its bandpass positioned about the second harmonic of the fundamental frequency and its bandpass is set depending upon the expected frequency response from the particular contrast agent being utilized. The bandpass of filter 52 is further adjusted in accordance with whether the transmitted ultrasound energy is sufficient to cause destruction of the contrast agent or not.

The respective signals from filters 50 and 52 are fed to respectively connected quadrature detectors 60 and 62 of known configuration. Briefly stated, quadrature mixers 80, 82, 90, and 92 reduce the output signals from filters 50 and 52 to baseband so as to enable their respective signals to be mathematically combined. Thus, quadrature circuit 60 includes a pair of mixers 80, 82 to which are respectively applied local oscillator signals having a 0° phase and a 90° relative phase. The outputs from mixers 80 and 82 are applied to a pair of lowpass filters 84 and 86 and then to a detector 88 which calculates the square root of the sum of the squares of the outputs of mixers 80 and 82.

The output from detector 88 is fed as the fundamental frequency input to a log/compression module 64. Similar actions take place in quadrature detection circuit 62 (i.e., mixers 90, 92, integrators 94, 96 and detector 98). The output from quadrature detection circuit 62 is fed to log/compression module 64 which, in turn, feeds its respective outputs for both the fundamental and the harmonic to a summing circuit 66. There, the difference between the harmonic and fundamental signals is calculated, and is fed through a lowpass filter 70 to scan converter 32. The calculated difference represents the ratio of the energies of the H and F bins (i.e., log(H/F)=logH−logF).

Accordingly, it can be seen that by simply analyzing the frequency response of each ultrasound interrogation line, that signal returns from both contrast agent and tissue can be discriminated. This enables the contrast agent to be emphasized on a subsequent display by application of a mapped color value, in accordance with the determined ratio of the fundamental to the harmonic return.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for detecting the presence of contrast agent in the body of a patient through ultrasonic interrogation, comprising the steps of:
   a) transmitting a plurality of pulses exhibiting a fundamental transmission frequency into said body and receiving a set of returned signals after each pulse transmission;
   b) segregating frequency content of each said set of returned signals into at least a first group about said fundamental transmission frequency and a second group about a harmonic frequency of said fundamental transmission frequency; and
   c) determining a relationship of a characteristic of at least said first group and second group for each said set of returned signals, each said relationship for a scan line indicating a proportion of said return signal returned from contrast agent versus a proportion of said return signal returned from tissue.

2. The method as recited in claim 1, wherein said harmonic frequency is the second harmonic of said fundamental transmission frequency.

3. The method as recited in claim 1, wherein said characteristic is energy content.

4. The method as recited in claim 1, wherein said relationship is a difference in an energy content of said first group from an energy content of said second group.

5. The method as recited in claim 1, wherein said relationship is an energy content of said first group divided by an energy content of said second group.

6. The method as recited in claim 1, wherein said contrast agent includes microbubbles and at least some of said pulses are of sufficient energy to rupture said microbubbles.

7. The method as recited in claim 1, comprising the further step of:
   d) displaying an image of a portion of said body that is being interrogated by said pulses and mapping colors onto said image in accord with said relationship determined in step c).

8. A system for detecting the presence of contrast agent in the body of a patient through ultrasonic interrogation, comprising:
   a) transducer means for transmitting a plurality of pulses exhibiting a fundamental transmission frequency into said body and receiving a set of return signals after each pulse transmission;
   b) filter means for segregating a frequency content of each said set of return signals into at least a first group about said fundamental transmission frequency and, at least, a second group about a harmonic frequency of said fundamental transmission frequency; and
   c) logic means for determining a relationship of a characteristic of said first group and second group for each said set of returned signals, each said relationship for a scan line indicating a proportion of said return signal returned from contrast agent versus a proportion of said return signal returned from tissue.

9. The system as recited in claim 8, wherein said harmonic frequency is the second harmonic of said fundamental transmission frequency.

10. The system as recited in claim 8, wherein said characteristic is energy content.

11. The system as recited in claim 8, wherein said logic means determines a difference in an energy content of said first group from an energy content of said second group.

12. The system as recited in claim 8, wherein said logic means determines said relationship by dividing an energy content of said first group by an energy content of said second group.

13. The system as recited in claim 8, wherein said contrast agent includes microbubbles and said transducer means transmits at least some of said pulses with sufficient energy to rupture said microbubbles.

14. The system as recited in claim 8, further comprising:
   d) means for displaying an image of a portion of said body that is being interrogated by said pulses and mapping colors onto said image in accord with said relationship determined by said logic means so as to emphasize said contrast agent.

* * * * *